US009927799B2

(12) United States Patent
Mitsuhashi et al.

(10) Patent No.: US 9,927,799 B2
(45) Date of Patent: Mar. 27, 2018

(54) NUMERICAL CONTROL (NC) PROGRAM GENERATING APPARATUS CONSIDERING POWER SAVING

(71) Applicant: DMG MORI SEIKI CO., LTD., Nara (JP)

(72) Inventors: Susumu Mitsuhashi, Nara (JP);
Makoto Fujishima, Nara (JP);
Takayuki Nakamura, Nara (JP);
Hiroshi Shimanoe, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 639 days.

(21) Appl. No.: 14/593,357

(22) Filed: Jan. 9, 2015

(65) Prior Publication Data
US 2015/0205286 A1    Jul. 23, 2015

(30) Foreign Application Priority Data

Jan. 20, 2014    (JP) ................................ 2014-007551

(51) Int. Cl.
*G05B 19/408*   (2006.01)
*G05B 19/4093*  (2006.01)
*G06F 19/00*    (2018.01)

(52) U.S. Cl.
CPC ..... *G05B 19/408* (2013.01); *G05B 19/40937* (2013.01); *G05B 2219/36031* (2013.01); *G05B 2219/36289* (2013.01); *Y02P 90/265* (2015.11)

(58) Field of Classification Search
CPC ............ G05B 19/408; G05B 19/40937; G05B 2219/36031; G05B 2219/36289; Y02P 90/265

See application file for complete search history.

(56) References Cited

U.S. PATENT DOCUMENTS 4,831,906 A * 5/1989 Sugimoto ................. B23B 7/06
                                        82/117
5,173,648 A * 12/1992 Kawamura .......... G05B 19/182
                                        318/567

(Continued)

FOREIGN PATENT DOCUMENTS

JP    01300303 A    12/1989
JP    2001277071 A  10/2001

(Continued)

OTHER PUBLICATIONS

Cubides et al., "Modeling and Minimization of Energy Consumption in Machine Tools", Politecnico Di Milano, 2012, 156pg.*

*Primary Examiner* — Ryan D. Coyer
(74) *Attorney, Agent, or Firm* — Miller, Matthias & Hull LLP

(57) ABSTRACT

A numerical control (NC) program generating apparatus includes a standby state analyzing unit 12 analyzing an NC program to determine whether a block in which an operation unit is brought into a standby state is present, and when such a block is present, determining whether a power source 39, 45, 46 corresponding to the operation unit can be stopped at the time of execution of the block to specify a stoppable block, and a power operation code inserting unit 13 inserting an operation code for stopping the corresponding power source 39, 45, 46 at the time of execution of the stoppable block into the NC program and inserting an operation code for restarting the power source 39, 45, 46 after the execution of the block into the NC program.

6 Claims, 11 Drawing Sheets

(56) References Cited

U.S. PATENT DOCUMENTS

| | | | | |
|---|---|---|---|---|
| 5,189,624 A | * | 2/1993 | Barlow | G05B 19/182 |
| | | | | 700/169 |
| 6,505,092 B1 | * | 1/2003 | Fukaya | G05B 19/4068 |
| | | | | 700/179 |
| 6,741,905 B1 | * | 5/2004 | Fishman | G05B 19/40937 |
| | | | | 142/3 |
| 9,618,926 B1 | * | 4/2017 | Louette | G05B 19/18 |
| 2002/0151420 A1 | * | 10/2002 | Scott | B23K 26/10 |
| | | | | 483/29 |
| 2003/0163208 A1 | * | 8/2003 | Sugiyama | G05B 19/40938 |
| | | | | 700/28 |
| 2006/0156042 A1 | * | 7/2006 | Desai | G06F 1/28 |
| | | | | 713/300 |
| 2006/0225046 A1 | * | 10/2006 | Feekes, Jr. | G06F 1/3203 |
| | | | | 717/127 |
| 2007/0124094 A1 | * | 5/2007 | Brey | G06F 1/3203 |
| | | | | 702/60 |
| 2010/0026102 A1 | * | 2/2010 | Landgraf | G05B 19/0428 |
| | | | | 307/116 |
| 2016/0124416 A1 | * | 5/2016 | Besuchet | G05B 19/042 |
| | | | | 700/173 |

FOREIGN PATENT DOCUMENTS

| | | |
|---|---|---|
| JP | 2011118952 A | 6/2011 |
| WO | 2012043786 A1 | 4/2012 |

* cited by examiner

FIG. 2

| Step | First tool rest ||||| Second tool rest |||||
|---|---|---|---|---|---|---|---|---|---|---|
| | Step name | Tool name | Rough/Finish | T code | R/D | Step name | Tool name | Rough/Finish | T code | R/D |
| 1 | Grooving | Endmill | Rough | 1111 | 3.000 | Drilling | Center drill | | 1111 | |
| 2 | Grooving | Endmill | Rough | 1111 | 3.000 | | | | | |
| 3 | Waiting | M100P12 | | | | Waiting | M100P12 | | | |
| 4 | Drilling | Drill | | 0707 | 8.600 | Outer diameter machining | General-purpose outer diameter | Rough finishing | 0202 | 0.800 |
| 5 | Waiting | M101P12 | | | | Waiting | M101P12 | | | |
| 6 | Outer diameter machining | General-purpose outer diameter | Rough finishing | 0202 | 0.800 | | | | | |
| 7 | Groove outer diameter machining | Groove outer diameter | Rough finishing | 0606 | 6.000 | | | | | |

FIG. 3

First tool rest program

O19
N1 (ENDMILL)
G0T1111
G97S3180M13
G0Z6.
.
.
M130
M01

N2 (ENDMILL)
G97S3180M13
G0Z6.
.
.
M131
M01

N3
M100

N4 (DRILL, 8.600, T0707, H19)
G0T0707
G97S860M13
G0Z5.
.
.
M132
M01

N5
M101

N6 (OUTER DIAMETER, ROUGH FINISHING)
G0T0202
G96S200M3
G0Z3.
.
.
M133
M01

N7 (GROOVING, ROUGH FINISHING)
G0T0606
G97S99M3
G0Z3.
.
.
M134
M01

Second tool rest program

O19
N1 (CENTER.DRILL)
G0T1111
G97S200M13
G0Z5.
.
.
M130
M01

N2
M131
M01

N3
M100

N4 (OUTER DIAMETER, ROUGH FINISHING)
G0T0202
G96S200M3
G0X104.Z3.
.
.
M132
M01

| Operation unit | Power source/ Electric equipment | Saved power per unit (W/min) | Power required for stop and restart (W) | Limit number of times of operation La (number of times) | Lifetime Lt (year) | Life coefficient Lc (=La/Lt) |
|---|---|---|---|---|---|---|
| First tool rest | Feed motor 53 (Z axis) | * | * | * | * | * |
| | Feed motor 55 (Z axis) | * | * | * | * | * |
| | Feed motor 60 (X axis) | * | * | * | * | * |
| Second tool rest | Feed motor 46 (Z axis) | * | * | * | * | * |
| | Feed motor 45 (X axis) | * | * | * | * | * |
| First headstock 33 | First spindle motor | * | * | * | * | * |
| Second headstock 35 | Second spindle motor | * | * | * | * | * |
| | Feed motor 39 (Z axis) | * | * | * | * | * |
| Coolant pump | Magnet contactor | | | | | |
| | Pump motor | | | | | |
| . . . | . . . | . . . | . . . | . . . | . . . | . . . |

FIG. 6

First tool rest program

O19
N1 (ENDMILL)
M773
G0T1111
G97S3180M13
G0Z6.
.
.
.
M130
M01

N2 (ENDMILL)
G97S3180M13
G0Z6.
.
.
M131
M01

N3
M100

N4 (DRILL,  8.600, T0707 , H19)
G0T0707
G97S860M13
G0Z5.
.
.
M132
M01

N5
M101

N6 (OUTER DIAMETER, ROUGH FINISHING)
G0T0202
G96S200M3
G0Z3.
.
.
M133
M01

N7 (GROOVING, ROUGH FINISHING)
G0T0606
G97S99M3
G0Z3.
.
.
M134
M01

Second tool rest program

O19
N1 (CENTER.DRILL)
M773
G0T1111
G97S200M13
G0Z5.
.
.
M774
M130
M01

N2
M131
M773
M01

N3
M100

N4 (OUTER DIAMETER, ROUGH FINISHING)
G0T0202
G96S200M3
G0X104.Z3.
.
.
M774
M132
M01

N5
M101

N6
M133
M01

N7
M134
M01

NUMERICAL CONTROL (NC) PROGRAM GENERATING APPARATUS CONSIDERING POWER SAVING

BACKGROUND

Field of the Disclosure

The present disclosure relates to a numerical control (NC) program generating apparatus which generates, for an NC machine tool including a plurality of operation units each having a power source, an NC program for controlling the operation units and which is capable of saving power.

Background of the Disclosure

Operation control methods and numerical control methods are known that attempt to save power during use of a machine tool.

For example, Japanese Unexamined Patent Application Publication No. 2001-277071 ("the JP '071 publication") discloses an operation control method in which, when operation of the machine tool cannot be continued due to the presence of incorrect syntax or an incorrect command code description in a command in a machining program or due to the occurrence of abnormality in a controller or the machine tool and this brings the machine tool into a machining interrupted state or a suspended state, rotation of a spindle is stopped and operation of supplementary equipment such as a coolant supply system and the like is stopped.

It is noted that the determination of whether or not the machine tool is in a machining interrupted state or a suspended state is made by monitoring a control command state and an operation state of the machine tool in the state where the machine tool is set to an automatic operation mode, and the machine tool is determined to be in a machining interrupted state or a suspended state in each of the following cases: a) the case where, during the machine tool being in the automatic operation mode, there is no movement command and no interrupt operation is performed; b) the case where, during the machine tool being in the automatic operation mode, a speed command is zero in the middle of a movement command; and c) the case where, during the machine tool being in the automatic operation mode, there is no movement command and there is no interrupt movement command in the middle of an interrupt operation.

According to the operation control method described in the JP '071 publication, in the case where the machine tool is brought into a machining interrupted state or a suspended state, power saving processing, such as stopping rotation of a spindle, stopping operation of a coolant supply unit, and stopping operation of a chip discharge conveyor, is executed; therefore unnecessary power consumption during the machine tool being in a machining interrupted state or a suspended state is prevented, thereby saving power.

Further, a numerical control method is disclosed in Japanese Unexamined Patent Application Publication No. 2011-118952 ("the JP '952 publication") that is used when rotating a spindle. In the method, a machining program is analyzed by reading at least one block ahead and, based on the results of the pre-reading analysis, an execution time until cutting feed is started after a spindle rotation command is made and a spindle acceleration time until the number of times of spindle rotation reaches the number of times following the spindle rotation command after starting the spindle are calculated, and when the elapsed time after the spindle rotation command was made exceeds a time obtained by subtracting the spindle acceleration time from the execution time, the spindle is started.

Further, the JP '952 publication discloses a numerical control method for stopping the spindle in the middle of a spindle rotation command, and in the method, a machining program is analyzed by reading at least one block ahead. In the case where, as a result of the read-ahead analysis, it is in the middle of a spindle rotation command and there is a non-cutting block, a spindle stop time from the non-cutting block to start of cutting feed and a spindle acceleration/deceleration time are calculated based on the results of the read-ahead analysis, and when the spindle stop time is longer than the spindle acceleration/deceleration time, rotation of the spindle is stopped.

According to the numerical control methods disclosed in the JP '952 publication, taking the spindle acceleration time into consideration, start of the spindle can be delayed until just before start of cutting feed; therefore, the power required for rotation of the spindle can be reduced and saved as much as the delay. Further, when there is a non-cutting block, rotation of the spindle is stopped taking the spindle acceleration/deceleration time into consideration; therefore, the power required for rotation of the spindle can be reduced and saved as much as the amount related to the stop of the spindle.

SUMMARY OF THE DISCLOSURE

Incidentally, in the field of machining using a machine tool, reduction of machining costs is always desired. In this sense, the operation control method disclosed in the JP '071 publication and the numerical control method disclosed in the JP '952 publication can save power by stopping rotation of the spindle, and thereby machining costs can be reduced.

However, in terms of saving power for reducing unnecessary power consumption in a machine tool, neither the operation control method disclosed in the JP '071 publication nor the numerical control method disclosed in the JP '952 publication can yet be said to be sufficient.

That is, some machine tools include a plurality of operation units each having a power source, and, depending on machining, it is possible that at least one of the operation units is brought into a standby state. In such a case, in terms of power saving, it is preferred that a power source corresponding to the operation unit is brought to a stop by interrupting or restricting power supplied to the power source. For example, in the case of a feed apparatus having a feed axis disposed along the vertical direction, when the feed apparatus is in a standby state, power is constantly supplied to a servo motor in order to stop a slide at a predetermined position against the gravity. Therefore, when the feed apparatus is in a standby state, power can be saved by interrupting or restricting supply of power to the servo motor that is a power source thereof.

However, conventionally, even when an operation unit is brought into a standby state, power continues to be supplied to a power source thereof; therefore, further improvement is necessary in terms of power saving.

The subject matter disclosed herein has been achieved in view of the above-described circumstances, and an object thereof is to provide an NC program generating apparatus enabling, in an NC machine tool including a plurality of operation units each having a power source, a power source of an operation unit to be brought into a standby state to be brought to a stop.

The present disclosure solves the above-described problems by providing an NC program generating apparatus which generates, for an NC machine tool including a plurality of operation units each having a power source, an NC program for controlling the operation units, and is configured to have:

a standby state analyzing unit which is connected to another NC program generating apparatus or an NC program storage unit storing therein an already generated NC program and which analyzes an NC program generated by the another program generating apparatus or the NC program stored in the NC program storage unit to determine whether, among a plurality of blocks forming the NC program, a block in which at least one of the operation units is brought into a standby state is present or not, and when a block in which at least one of the operation units is brought into a standby state is present, determines whether a power source corresponding to the operation unit can be brought to a stop by interrupting or restricting power supplied to the power source at the time of execution of the block or not, thereby specifying a block at which the power source can be stopped; and a power operation code inserting unit which, when a block at which the power source can be stopped is specified by the standby state analyzing unit, inserts an operation code for stopping the power source at the time of execution of the block into the NC program and inserts an operation code for restarting the power source after the execution of the block into the NC program.

According to this NC program generating apparatus, an NC program generated by another NC program generating apparatus or an NC program stored in an NC program storage unit is analyzed by the standby state analyzing unit and it is determined whether, among a plurality of blocks forming the NC program, a block in which at least one of the operation units is brought into a standby state is present or not. When a block in which at least one of the operation units is brought into a standby state is present, it is determined whether a power source corresponding to the operation unit can be brought to a stop by interrupting or restricting power supplied to the power source at the time of execution of the block, and based on the result of this determination, a block at which the power source can be stopped is specified.

When a block at which the power source can be stopped is specified by the standby state analyzing unit, subsequently the power operation code inserting unit inserts an operation code for stopping the corresponding power source at the time of execution of the block into the NC program and inserts an operation code for restarting the power source after the execution of the block into the NC program.

Thus, when machining is executed by the machine tool using the thus generated NC program, at the time of execution of the block in which an operation unit is brought into a standby state, the operation code for stopping the power source corresponding to the operation unit is executed and thereby the power source is brought to a stop, and after the execution of the block, the operation code for restarting the power source is executed and thereby the power source is restarted.

Thus, according to an NC program generated by the NC program generating apparatus of the present disclosure, when an operation unit is brought into a standby state, supply of power to a power source corresponding to the operation unit is interrupted or restricted; therefore, it is possible to reduce unnecessary power consumption and it is possible to further save power as compared with the conventional art.

It is noted that examples of the operation units of the machine tool are given as follows: a ball screw mechanism or the like with a servo motor as a power source thereof corresponds to an operation unit related to feed axis; a spindle with a spindle motor as a power source thereof corresponds to an operation unit related to spindle; and a pump with a motor as a power source thereof corresponds to an operation unit related to coolant.

The standby state analyzing unit in the NC program generating apparatus may be configured to estimate power saved when the power source corresponding to the operation unit to be brought into a standby state is stopped, compare the estimated saved power with power estimated to be required for restarting the power source, and, when the estimated saved power is larger than the estimated power for restart, determine that the power source can be stopped.

In the case where the standby time of the operation unit is short, even if the power source corresponding thereto is stopped, it cannot be expected that a large amount of power can be reduced. To the contrary, power required when restarting the power source can be larger than reduced power, and in such a case, a larger amount of power is consumed as compared with the case where the power source is not stopped, which results in "putting the cart before the horse". According to the above configuration, it is possible to stop the power source when the estimated saved power is larger than the estimated power for restart; therefore, it is possible to surely save power.

Further, the standby state analyzing unit may be configured to estimate, with respect to the power source corresponding to the operation unit to be brought into a standby state, an operation coefficient Ac that is the ratio of the number of times of operation Aa during machining using the NC program when the power source is stopped and restarted during the standby state to a machining time At taken when using the NC program and compare the estimated operation coefficient Ac with a life coefficient Lc that is the ratio of a limit number of times of operation La to a lifetime Lt set for the power source, to determine whether the corresponding power source can be stopped or not.

It is noted that the operation coefficient Ac is Ac=Aa/At or Ac=At/Aa, while the life coefficient Lc is Lc=La/Lt or Lc=Lt/La. When the value of Ac (=Aa/At) is smaller than the value of Lc (=La/Lt), the standby state analyzing unit determines that the power source can be stopped; alternatively, when the value of Ac (=At/Aa) is larger than the value of Lc (=Lt/La), the standby state analyzing unit determines that the power source can be stopped. According to this determination method, even if a power source in a standby state is stopped and then restarted, the total number of times of operation within the lifetime Lt does not exceed the limit number of times of operation La; therefore, the power source can be used as long as possible within the lifetime Lt.

Usually, recommended limit number of times of operation La and lifetime Lt are set for a power source. Therefore, if start and stop of a power source are repeated too frequently, a disadvantage is caused that the number of times of operation reaches the limit number of times of operation La in a time considerably shorter than the lifetime Lt and consequently the power source has to be replaced. Many of the power sources of the operation units are expensive, such as the above-mentioned servo motor and spindle motor; therefore, even if power can be saved, the cost reduction effect will be cancelled or be very small if the lives of the power sources are shortened.

According to the above determination method, as described above, even if the operation of stopping the power source in the standby state is performed, the power source can be used as long as possible within its lifetime Lt;

therefore, power can be saved without increase of costs caused by the life of the power source.

Further, the standby state analyzing unit may be configured to: estimate power saved when the power source corresponding to the operation unit to be brought into a standby state is stopped and compare the estimated saved power with power estimated to be required for restarting the power source; estimate, with respect to the power source, an operation coefficient Ac that is the ratio of the number of times of operation Aa during machining using the NC program when the power source is stopped and restarted during the standby state to a machining time At taken when using the NC program and compare the estimated operation coefficient Ac with a life coefficient Lc that is the ratio of a limit number of times of operation La to a lifetime Lt set for the power source, and when the estimated saved power is larger than the estimated power for restart and it is determined, based on the comparison of the operation coefficient Ac with the life coefficient Lc, that the power source can be stopped, determine that the power source can be stopped.

When thus configured, it is possible to stop the power source when the estimated saved power is larger than the estimated power for restart and save power without increase of costs caused by the life of the power source; therefore, cost reduction in machining can be surely realized.

Further, the standby state analyzing unit may be configured to, in the case where there is electric equipment for starting and stopping the power source, further estimate the operation coefficient Ac with respect to the electric equipment and determine, based additionally on comparison of the estimated operation coefficient Ac with a life coefficient Lc set for the electric equipment, whether the corresponding power source can be stopped or not.

Similarly to the power source, recommended limit number of times of operation La and lifetime Lt are set also for the electric equipment for starting and stopping the power source, such as a magnet switch and a relay, for example. Therefore, if operation of the electric equipment is frequently repeated, the number of times of operation reaches the limit number of times of operation La in a time considerably shorter than the lifetime Lt and consequently the electric equipment has to be replaced. Even though the electric equipment is not so expensive as the above-mentioned servo motor and spindle motor, if the life thereof is shortened, machining costs will be increased as much as the costs therefor.

According to the above configuration, even if the operation of stopping the power source in the standby state is performed, it is possible to use the electric equipment as long as possible within its lifetime Lt; therefore, power can be saved without increase of costs caused by the electric equipment.

It is noted that the operation coefficient Ac of the electric equipment is Ac=Aa/At or Ac=At/Aa, where Aa represents the number of times of operation of the electric equipment during machining using the NC program and At represents a machining time taken when using the NC program. On the other hand, the life coefficient Lc is Lc=La/Lt or Lc=Lt/La. When the value of Ac (=Aa/At) is smaller than the value of Lc (=La/Lt), the standby state analyzing unit determines that the power source can be stopped; alternatively, when the value of Ac (=At/Aa) is larger than the value of Lc (=Lt/La), the standby state analyzing unit determines that the power source can be stopped.

As described above, according to the present disclosure, it is possible to generate an NC program which, in the case where a block in which at least one of the operation units is brought into a standby state is present in an NC program and a power source corresponding to the operation unit can be brought to a stop by interrupting or restricting power supplied to the power source at the time of execution of the block, enables the power source to be stopped at the time of execution of the block and restarted after the execution of the block. Further, by performing machining using such an NC program, when an operation unit is brought into a standby state, supply of power to a power source corresponding to the operation unit can be interrupted or restricted. Thereby, more power can be saved as compared with the conventional art.

Further, with a configuration in which power saved when the power source corresponding to the operation unit to be brought into a standby state is stopped is estimated and the estimated saved power is compared with power estimated to be required for restarting the power source, and when the estimated saved power is larger than the estimated power for restart, the power source is stopped, it is possible to surely save power.

Further, with a configuration in which, in the standby state analyzing unit, with respect to the power source corresponding to the operation unit to be brought into a standby state, an operation coefficient Ac that is the ratio of the number of times of operation Aa during machining using the NC program when the power source is stopped and restarted during the standby state to a machining time At taken when using the NC program is estimated and the estimated operation coefficient Ac is compared with a life coefficient La that is the ratio of a limit number of times of operation La to a lifetime Lt set for the power source, thereby determining whether the corresponding power source can be stopped or not, the total number of times of operation within the lifetime Lt does not exceed the limit number of times of operation La even if the power source in the standby state is stopped and then restarted, and therefore the power source can be used as long as possible within its lifetime Lt. Consequently, power can be saved without increase of costs caused by the life of the power source.

Furthermore, with a configuration in which, in the case where there is electric equipment for starting and stopping the power source, in the standby state analyzing unit, the operation coefficient Ac is estimated with respect to the electric equipment and it is determined, based additionally on comparison of the estimated operation coefficient Ac with a life coefficient Lc set for the electric equipment, whether the corresponding power source can be stopped or not, the electric equipment also can be used as long as possible within its lifetime Lt; therefore, power can be saved without increase of costs caused by the electric equipment.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

For a more complete understanding of the disclosed methods and apparatus, reference should be made to the embodiment illustrated in greater detail on the accompanying drawings, wherein:

FIG. 2 is an explanatory diagram showing an example of data for interactive input that is input by processing in an interactive input unit according to the embodiment;

FIG. 3 is an explanatory diagram showing an example of an NC program generated by a first generation unit according to the embodiment;

FIG. 4 is an explanatory diagram showing an example of data stored in a data for specification storage unit according to the embodiment;

FIG. 6 is an explanatory diagram showing an example of an NC program generated by a second generation unit according to the embodiment;

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

A specific embodiment of the present disclosure will be described below with reference to the drawings.

Figure 7:
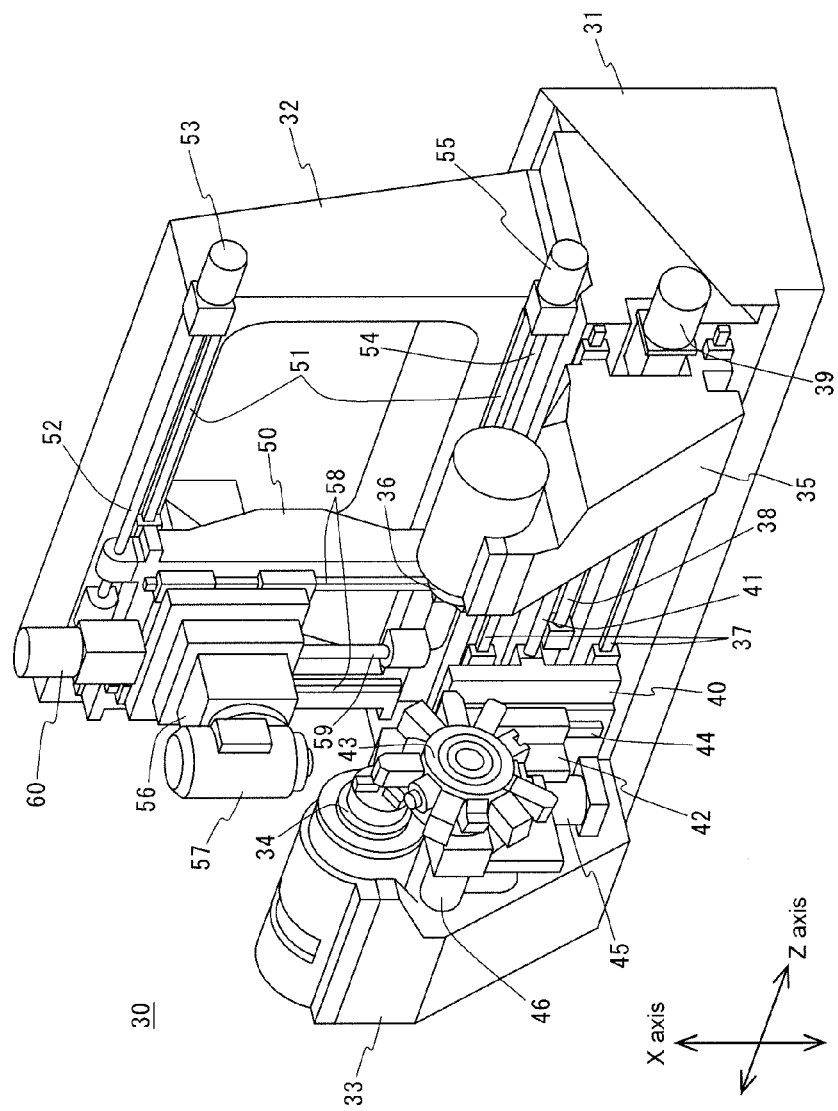
FIG. 7 is a perspective view of a machine tool according to the embodiment.

First of all, an example of a machine tool numerically controlled by an NC program according to this embodiment is described based on FIG. 7.

As shown in FIG. 7, a machine tool 30 of this embodiment includes a bed 31, a column 32 fixed on a top surface of the bed 31, a first headstock 33 and a second headstock 35 provided on a vertical front end surface of the bed 31 in such a manner that they face each other, a saddle 40 provided between the first headstock 33 and the second headstock 35 on the front end surface of the bed 31, a tool rest 42 provided on a front end surface of the saddle 40, a turret 43 held by the tool rest 42, a saddle 50 provided on a vertical front end surface of the column 32, a tool headstock 56 provided on a front end surface of the saddle 50, a tool spindle 57 held by the tool headstock 56, and other components.

The first headstock 33 is fixedly provided on the front end surface of the bed 31 and holds a first spindle 34 in such a manner that the first spindle 34 is rotatable about an axis thereof. On the other hand, the second headstock 35 holds a second spindle 36 in such a manner that the second spindle 36 is rotatable and an axis thereof is coaxial with the axis of the first spindle 34, and the second headstock 35 is movable in a Z-axis direction, which is indicated by an arrow in the figure, by a pair of guide rails 37, 37 provided on the front end surface of the bed 31 and is moved in the Z-axis direction by a feed motor 39 and a feed screw 38. It is noted that the first spindle 34 is driven by a first spindle motor which is not shown, and the second spindle 36 is driven by a second spindle motor which is not shown.

Further, the saddle 40 is disposed to be movable in the Z-axis direction by the pair of guide rails 37, 37 and is moved in the Z-axis direction by a feed screw 41 and a feed motor 46. On the other hand, the tool rest 42 is movable in an X-axis direction, which is indicated by an arrow in the figure, by a pair of guide rails 44 (one of the guide rails is not shown) disposed on the front end surface of the saddle 40 and is moved in the X-axis direction by a feed screw which is not shown, and a feed motor 45.

The saddle 50 is disposed to be movable in the Z-axis direction by a pair of guide rails 51, 51 disposed on the front end surface of the column 32 and is moved in the Z-axis direction by a feed screw 52 and a feed motor 53 and by a feed screw 54 and a feed motor 55. On the other hand, the spindle headstock 56 is movable in the X-axis direction by a pair of guide rails 58, 58 disposed on the front end surface of the saddle 50 and is moved in the X-axis direction by a feed screw 59 and a feed motor 60.

Thus, in the machine tool 30, the first spindle 34 and the second spindle 36 are respectively driven and rotated about their respective axes by the first and second spindle motors which are not shown; the turret 43 is moved in a two-dimensional plane with the X axis and the Z axis by the feed motor 45 and the feed motor 46; and the tool spindle 57 is also moved in a two-dimensional plane with the X axis and the Z axis by the feed motors 53, 55 and the feed motor 60. Therefore, the first spindle 34, the second spindle 36, a set of the second headstock 35 and the feed screw 38, a set of the saddle 40, the tool rest 42, the turret 43 and the feed screw 41, and a set of the saddle 50, the tool headstock 56 and the tool spindle 57 are defined as operation units, and the first spindle motor (not shown), the second spindle motor (not shown), the feed motor 39, the feed motor 45, the feed motor 46, the feed motors 53, 55 and the feed motor 60 are defined as power sources of the operation units. It is noted that each of the feed motors 39, 45, 46, 53, 55 and 60 comprises a servo motor.

Next, an NC program generating apparatus according to this embodiment is described based on FIGS. 1 to 6.

Figure 1:
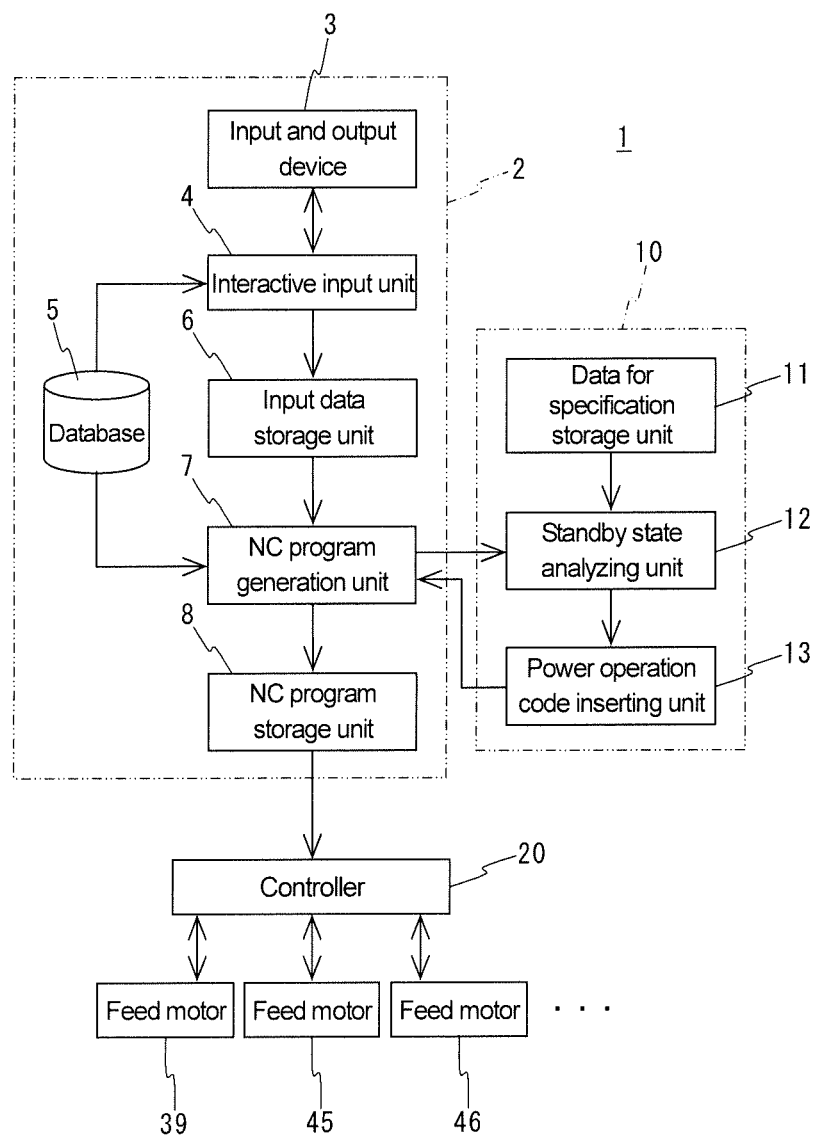
FIG. 1 is a block diagram showing an NC program generating apparatus according to one embodiment of the present disclosure.

As shown in FIG. 1, an NC program generating apparatus 1 of this embodiment includes a first generation unit 2 and a second generation unit 10. A finally generated NC program is transmitted to a controller 20 and the transmitted NC program is executed by the controller 20, and thereby the first spindle motor (not shown), the second spindle motor (not shown), the feed motor 39, the feed motor 45, the feed motor 46, the feed motors 53, 55, the feed motor 60, etc. of the machine tool 30 are numerically controlled by the controller 20.

The first generation unit 2 is a processing unit which automatically generates an NC program in a conventionally publicly known interactive manner, and includes an input and output device 3, an interactive input unit 4, a database 5, an input data storage unit 6, an NC program generation unit 7 and an NC program storage unit 8.

The input and output device 3 is configured to have a display device, such as a display, for displaying a screen and an input device, such as a keyboard or softkeys.

The database 5 stores therein information necessary for generating an NC program, that is, inherent information of the machine tool, information relating to workpiece material and workpiece basic shape, information relating to machined product basic shape, information relating to machining steps such as outer diameter machining, inner diameter machining and grooving, information relating to machining shape, information relating to tool specifications such as a tool number and the type, material and dimensions thereof, information relating to cutting conditions depending on workpiece material and tool material, and the like.

The interactive input unit 4 displays, on the display device of the input and output device 3, a screen for inputting specification data necessary for generating an NC program, that is, workpiece shape and dimensions, machining finished shape and dimensions, and the contents of machining steps, a screen for selecting a tool, and other screens, and causes an operator to input necessary data and stores the input data into the input data storage unit 6.

An example of data for interactive input that is input by the processing in the interactive input unit 4 is shown in FIG. 2. In FIG. 2, the tool headstock 56 having the tool spindle 57 and the tool rest 42 having the turret 43 in the machine tool 30 are referred to as a first tool rest and a second tool rest, respectively. In this example, the settings are made so that a workpiece is machined simultaneously using the first tool rest and using the second tool rest; the first tool rest is set to perform rough grooving by means of an endmill in its first step, finish grooving by means of an endmill in its second step, waiting in its third step, drilling in its fourth step, waiting in its fifth step, rough finishing of outer diameter in its sixth step, and rough finishing of groove outer diameter in its seventh step, while the second tool rest is set to perform drilling in its first step, no machining in its second step, waiting in its third step, rough finishing of outer diameter in its fourth step, waiting in its fifth step, and no machining in its sixth and seventh steps. It is noted that the numerical values of R/D in the figure mean a value of the nose radius in the case of a general-purpose cutting tool, the tool diameter in the case of a drill or an endmill, and the tool width in the case of a grooving tool.

The NC program generation unit 7 generates a tool path for each of the set steps based on the data for interactive input stored in the input data storage unit 6 and the information stored in the database 5 and sets appropriate cutting conditions for the set tool paths, and then generates an NC program by converting the obtained tool paths and cutting conditions into NC codes by appropriate processing and stores the generated NC program into the NC program storage unit 8. FIG. 3 shows an NC program generated by the NC program generation unit 7 based on the data for interactive input shown in FIG. 2 and the information stored in the database 5. N1 to N7 are sequence numbers and correspond to the steps in FIG. 2. It is noted that, although each of the sequences can include a single block, it usually includes a plurality of blocks.

Thus, according to this first generation unit 2, a desired NC program is automatically generated by an operator inputting necessary data through screens displayed on the display device of the input and output device 3 by the processing in the interactive input unit 4.

On the other hand, the second generation unit 10 is a processing unit which analyzes the NC program automatically generated by the first generation unit 2 and specifies a series of blocks in which an operation unit is brought into a standby state (hereinafter, this series of blocks are referred to as a block group; however, the block group includes a single block as well), and inserts an operation code for stopping a corresponding power source at the time of execution of the block group into the NC program and inserts an operation code for restarting the power source after the execution of the block group into the NC program.

As shown in FIG. 1, the second generation unit 10 includes a data for specification storage unit 11, a standby state analyzing unit 12 and a power operation code inserting unit 13.

The data for specification storage unit 11 is a processing unit which stores therein basic data for, in processing in the standby state analyzing unit 12 which is described in detail later, in the case where a block group in which an operation unit is brought into a standby state is present, determining whether a power source corresponding to the operation unit can be brought to a stop by interrupting or restricting power supplied to the power source at the time of execution of the block group. Specifically, basic data as shown in FIG. 4 is previously stored therein.

In the example shown in FIG. 4, for the power source corresponding to each of the operation units and, in the case where there is electric equipment for starting and stopping the power source, the electric equipment, data relating to "saved power per unit" when it is stopped, "power required for stop and start", a "limit number of times of operation La", a "lifetime Lt" and a "life coefficient Lc" are stored in the data for specification storage unit 11. It is noted that the "saved power per unit" and the "power required for stop and start" are theoretically or empirically obtained, and the "limit number of times of operation La" and the "lifetime Lt" are set by the manufacturer. Further, the "life coefficient Lc" is $Lc=La/Lt$ in this example. Furthermore, the operation units, the power sources and the electric equipment whose data should be stored are determined depending on the configuration of the machine tool to be operated.

Figure 5:
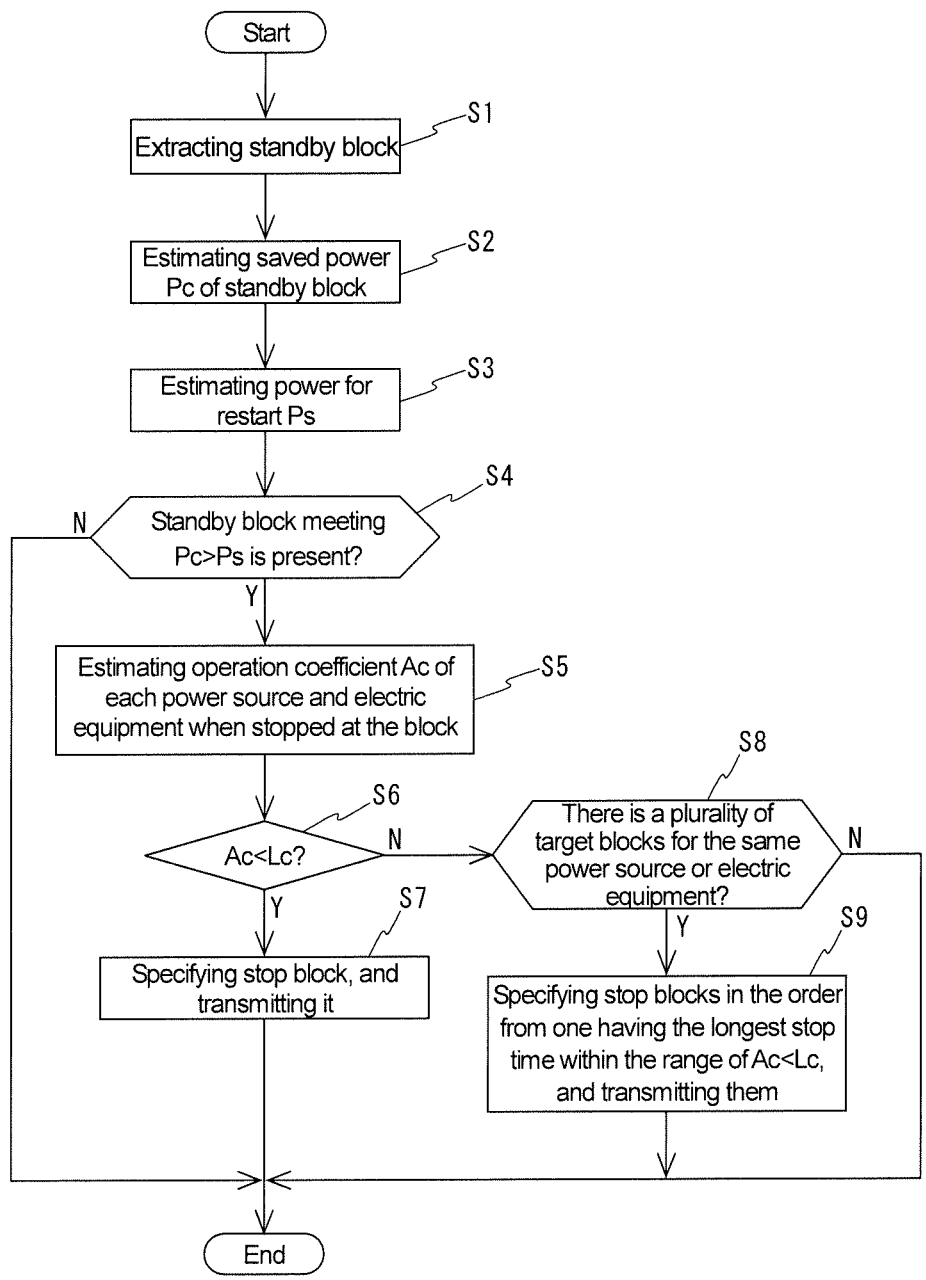
FIG. 5 is a flowchart showing processing in a standby state analyzing unit according to the embodiment.

The standby state analyzing unit 12 executes the processing shown in FIG. 5 to determine, in the case where a block group in which an operation unit is brought into a standby state is present, whether a power source corresponding to the operation unit can be brought to a stop by interrupting or restricting power supplied to the power source at the time of execution of the block group.

Specifically, the standby state analyzing unit 12 analyzes an NC program generated by the NC program generation unit 7 of the first generation unit 2, determines whether, among a plurality of blocks forming the NC program, a block group in which at least one of the operation units is brought into a standby state is present or not, and extracts this standby block group.

For example, in the case of the NC program shown in FIG. 3, the standby state analyzing unit 12 analyzes a first tool rest program and a second tool rest program and determines whether a block group in which one of the first tool rest and the second tool rest is brought into a standby state is present or not (Step S1).

A specific method of the determination is explained using the NC program shown in FIG. 3 as an example. In FIG. 3, N1 to N7 are sequence numbers; a code M130 represents a program end of the sequence N1; a code M131 represents a synchronization M code for waiting at a program end M01 of the sequence N2; a code M132 represents a synchronization M code for waiting at a program end M01 of the sequence N4; a code M133 represents a synchronization M code for waiting at a program end M01 of the sequence N6; and a code M134 represents a synchronization M code for waiting at a program end M01 of the sequence N7. Further, a code M100 of the sequence N3 and a code M101 of the sequence N5 are codes for synchronization between the first tool rest and the second tool rest. After both of the first tool rest program and the second tool rest program execute the code M100, the next sequence is executed; similarly, after both of them execute the code M101, the next sequence is executed.

Therefore, each of the first tool rest program and the second tool rest program is analyzed from its beginning, and an execution time of each of the sequences until the synchronization codes M100, M101 are detected is calculated and an execution time of each of the sequences after the synchronization code M101 is calculated. Further, their execution times are compared with each other to determine whether a sequence in which either one of the tool rests is not driven is present or not. It is noted that, in the example shown in FIG. 3, the sequence N1 of the second tool rest program is finished during execution of the sequence N1 of the first tool rest program; therefore, the second tool rest is brought into a standby state in a block group corresponding to the sequence N2. Further, the sequences N6 and N7 of the second tool rest program are not machining steps; therefore, the second tool rest is brought into a standby state in a block group corresponding to the sequences N6 and N7. Accordingly, the bock groups in which the second tool rest is brought into a standby state are determined.

Next, the standby state analyzing unit 12 estimates, with respect to the standby block group determined in Step S1, power Pc saved when a power source corresponding to the operation unit is stopped by interrupting or restricting power supplied to the power source (Step S2). For example, in the example shown in FIG. 3, since the second tool rest is brought into a standby state in the block group corresponding to the sequence N2 and the block group corresponding to the sequences N6 and N7, an execution time of the sequence N2 and an execution time of the sequences N6 and N7 of the first tool rest program are calculated and the data relating to the "saved power per unit" stored in the data for specification storage unit 11 is multiplied by each of the execution times, thereby calculating the "saved power Pc" when the feed motors 45, 46 of the second tool rest are stopped at the sequence N2 and the "saved power Pc" when they are stopped at the sequences N6 and N7.

Subsequently, the standby state analyzing unit 12 estimates an "power Ps" required for restarting the feed motors 45, 46 after stopping them with reference to the data relating to the power required for stop and restart stored in the data for specification storage unit 11 (Step S3), and then determines whether a standby block group in which the "saved power Pc" is larger than the "power for restart Ps" is present or not (Step S4). In the case where a block group in which the "saved power Pc" is larger than the "power for restart Ps" is present, the standby state analyzing unit 12 executes Step S5, while in the case where a block group in which the "saved power Pc" is larger than the "power for restart Ps" is not present, the processing is ended. It is noted that, in the example shown in FIG. 3, both of the "saved power Pc" when the feed motors 45, 46 of the second tool rest are stopped at the sequence N2 and the "saved power Pc" when they are stopped at the sequences N6 and N7 are larger than the "power for restart Ps" of the feed motors 45, 46.

In Step S5, the standby state analyzing unit 12 estimates an "operation coefficient Ac" of each of the power source and the electric equipment when the corresponding operation unit is stopped at the block group in which the "saved power Pc" is larger than the "power for restart Ps". This "operation coefficient Ac" is the ratio of "the number of times of operation Aa" of the power source or the electric equipment when the entire NC program is executed to a "machining time At" taken when using the NC program; it is Ac=Aa/At in this embodiment.

Next, the standby state analyzing unit 12 compares the "operation coefficient Ac" of each of the power source and the electric equipment estimated in Step S5 with the corresponding "life coefficient Lc" stored in the data for specification storage unit 11. In the case where the "operation coefficient Ac" is smaller than the "life coefficient Lc" with respect to all the power source and the electric equipment, the standby state analyzing unit 12 specifies the determined standby block group as a stoppable block group and transmits information on the block group to the power operation code inserting unit 13, and then ends the processing (Step S6).

For example, in the above example, when it is assumed that the feed motors 45, 46 of the second tool rest are stopped at the sequence N2 and at the sequences N6 and N7, the "operation coefficient Ac" is calculated for each of the feed motors 45, 46 and the calculated "operation coefficients Ac" are respectively compared with the "life coefficients Lc" of the feed motors 45, 46 stored in the data for specification storage unit 11, and in the case where both of them satisfy Ac<Lc, the sequence N2 and the sequences N6 and N7 are specified as stoppable block groups and information on the block groups are transmitted to the power operation code inserting unit 13. It is noted that, in the above example, both of the feed motors 45, 46 satisfy Ac<Lc.

On the other hand, in the case where, in Step S6, the "operation coefficient Ac" is not smaller than the "life coefficient Lc" for all the power source and the electric equipment, the standby state analyzing unit 12 proceeds to Step S8 and determines whether there is a plurality of block groups in which the same power source or electric equipment is brought into a standby state or not (Step S8). In the case where there are a plurality of such block groups, the block groups are specified as stoppable block groups in the order from the block group having the longest standby time (stop time) within the range of Ac<Lc, and these are transmitted to the power operation code inserting unit 13 and then the processing is ended (Step S9). On the other hand, in the case where, in Step S8, it is determined that there is not a plurality of block groups in which the same power source or electric equipment is brought into a standby state, the processing is ended there.

For example, in the above example, in the case where the feed motors 45, 46 do not satisfy Ac<Lc, since there are two block groups in which they are brought into a standby state: the sequence N2 and the sequences N6 and N7, if the standby time of the sequences N6 and N7 is longer than the standby time of the sequence N2, the standby state analyzing unit 12 calculates the "operation coefficient Ac" in the case where the feed motors 45, 46 are stopped at the sequences N6 and N7. In the case where the calculated "operation coefficient Ac" satisfies Ac<Lc, the standby state analyzing unit 12 specifies the sequences N6 and N7 as a stoppable block group and transmits information on the block group to the power operation code inserting unit 13. On the other hand, in the case where there is no standby block group which satisfies Ac<Lc, the processing is ended.

In the above-described way, the standby state analyzing unit 12 determines, in the case where a block group in which an operation unit is brought into a standby state is present, whether a power source corresponding to the operation unit can be brought to a stop by interrupting or restricting power supplied to the power source at the time of execution of the block group, and transmits information relating to a specified block group to the power operation code inserting unit 13.

In the case where a block group at which a power source can be stopped is specified by the standby state analyzing unit 12, the power operation code inserting unit 13 inserts an operation code for stopping the corresponding power source at the time of execution of the block group into the NC program and inserts an operation code for restarting the power source after the execution of the block group into the NC program.

For example, in the above example, in the case where, with respect to the sequence N2 and the sequences N6 and N7, information that the feed motors 45, 46 can be stopped is transmitted from the standby state analyzing unit 12, the power operation code inserting unit 13, as shown in FIG. 6, inserts a stop code M774 before the synchronization M code M130 of the sequence N1 of the second tool rest program, inserts a start code M773 after the synchronization M code M131 of the sequence N2, and inserts a stop code M774 before the synchronization M code M132 of the sequence N4. It is noted that because the program is ended at the sequence 7, no start code M773 is inserted after the synchronization M code M134 of the sequence N7. Instead, a start code M773 is inserted at the beginning of the sequence N1. Further, although no standby block group is present in the first tool rest program, a start code M773 is inserted at the beginning of the sequence N1 thereof for making sure.

Thus, according to the second generation unit 10 of this embodiment, an NC program generated by the first generation unit 2 is analyzed by the standby state analyzing unit 12, and it is determined whether, among a plurality of blocks forming the NC program, a block group in which at least one of the operation units is brought into a standby state is present or not. In the case where such a block group is present, it is determined whether a power source corresponding to the operation unit can be brought to a stop by interrupting or restricting power supplied to the power source at the time of execution of the block group or not, and based on the result of this determination, a block group at which the power source can be stopped is specified.

Further, in the case where a block group at which the power source can be stopped is specified by the standby state analyzing unit 12, subsequently the power operation code inserting unit 13 inserts an operation code for stopping the corresponding power source at the time of execution of the block into the NC program and inserts an operation code for restarting the power source after the execution of the block into the NC program.

Thus, when machining is performed by the machine tool 30 using the thus generated NC program, at the time of execution of the block group in which the operation unit is brought into a standby state, the operation code for stopping the power source corresponding to the operation unit is executed and thereby the power source is brought to a stop, and after the execution of the block, the operation code for restarting the power source is executed and thereby the power source is restarted.

Thus, according to an NC program generated by the second generation unit 10 of this embodiment, since, in the case where an operation unit is brought into a standby state, supply of power to a power source corresponding to the operation unit is interrupted or restricted, it is possible to reduce unnecessary power consumption and it is possible to save more power as compared with the conventional art.

Further, the standby state analyzing unit 12 is configured to estimate the "saved power Pc" saved when the power source corresponding to the operation unit to be brought into a standby state is stopped, and compare the estimated "saved power Pc" with the "power Ps" estimated to be required for restarting the power source, and when the "estimated saved power Pc" is larger than the "estimated power for restart Ps", determine that the power source can be stopped; therefore, it is possible to surely save power. That is, in the case where the standby time of the operation unit is short, even if the corresponding power source is stopped, it cannot be expected that a large amount of power can be reduced. To the contrary, power required when restarting the power source can be larger than reduced power, and in such a case, a larger amount of power is consumed as compared with the case where the power source is not stopped, which results in "putting the cart before the horse". According to the above configuration, it is possible to stop the power source when the estimated saved power is larger than the estimated power for restart; therefore, it is possible to surely save power.

Further, the standby state analyzing unit 12 is configured to estimate the "operation coefficient Ac" for the power source corresponding to the operation unit to be brought into a standby state and for the electric equipment for starting and stopping the power source and compare the estimated "operation coefficient Ac" with the "life coefficient Lc" of the power source to determine whether the corresponding power source can be stopped or not; therefore, even if the power source in a standby state is stopped and then restarted, the power source and the electric equipment can be used as long as possible within their respective "lifetimes Lt".

Usually, recommended "limit number of times of operation La" and "lifetime Lt" are set for a power source and electric equipment. Therefore, if start and stop of the power source are repeated too frequently, the number of times of operation reaches the "limit number of times of operation La" in a time considerably shorter than the "lifetime Lt", which cases a disadvantage that the power source and the electric equipment have to be replaced. Many of the power sources of the operation units, such as the above-mentioned servo motor and spindle motor, are expensive; therefore, even if power can be saved, the cost reduction effect will be cancelled or be very small if the lives of the power sources are shortened. Even though the electric equipment, such as a magnet switch and a relay, is not so expensive as the above-mentioned servo motor and spindle motor, if the life thereof is shortened, machining costs will be increased as much as the costs therefor.

According to the above-described determination method, even if the operation of stopping the power source in the standby state is performed, it is possible to use the power source and the electric equipment as long as possible within their respective "lifetimes Lt"; therefore, power can be saved without increase of costs caused by the lives of the power source and the electric equipment.

One embodiment of the present disclosure has been described above; however, a mode that can be adopted in the present disclosure is not limited thereto.

For example, in the above embodiment, for a program in which two tool rests are simultaneously driven, it is determined whether one of them is brought into a standby state and, in the case where one of them can be stopped, a corresponding power source is stopped; however, as a matter of course, the present disclosure is not limited thereto, and a power source of another operation unit to be brought into a standby state may be stopped. For example, besides the tool rests, a spindle and a coolant pump can be mentioned as another operation unit of the machine tool, and a spindle motor and a pump motor correspond to a power source of the spindle and a power source of the coolant pump, respectively.

Further, in the above embodiment, the "operation coefficient Ac" of the power source and the electric equipment is defined as Ac=Aa/At and the "life coefficient Lc" is defined as Lc=La/Lt; however, the "operation coefficient Ac" may be defined as Ac=At/Aa and the "life coefficient Lc" may be defined as Lc=Lt/La. In this case, when the value of the "operation coefficient Ac" is larger than the value of the "life coefficient Lc", the standby state analyzing unit 12 determines that the power source can be stopped. When thus configured, the same effect as that of the above embodiment can be achieved.

Figure 8:
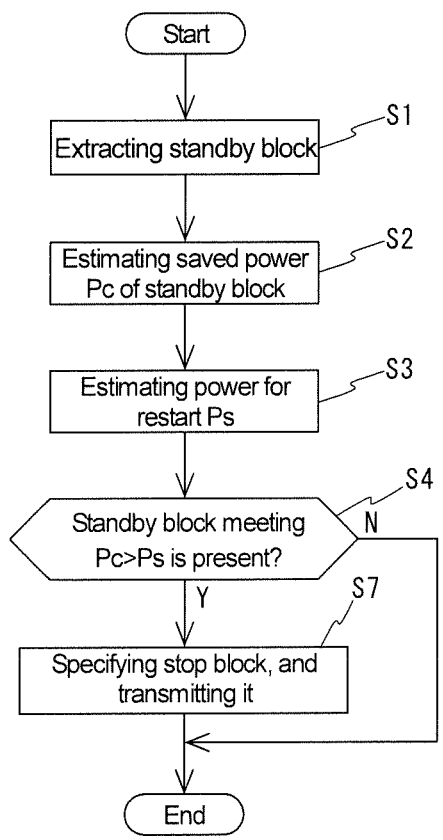
FIG. 8 is a flowchart showing processing in a standby state analyzing unit according to another embodiment of the present disclosure.
Figure 9:
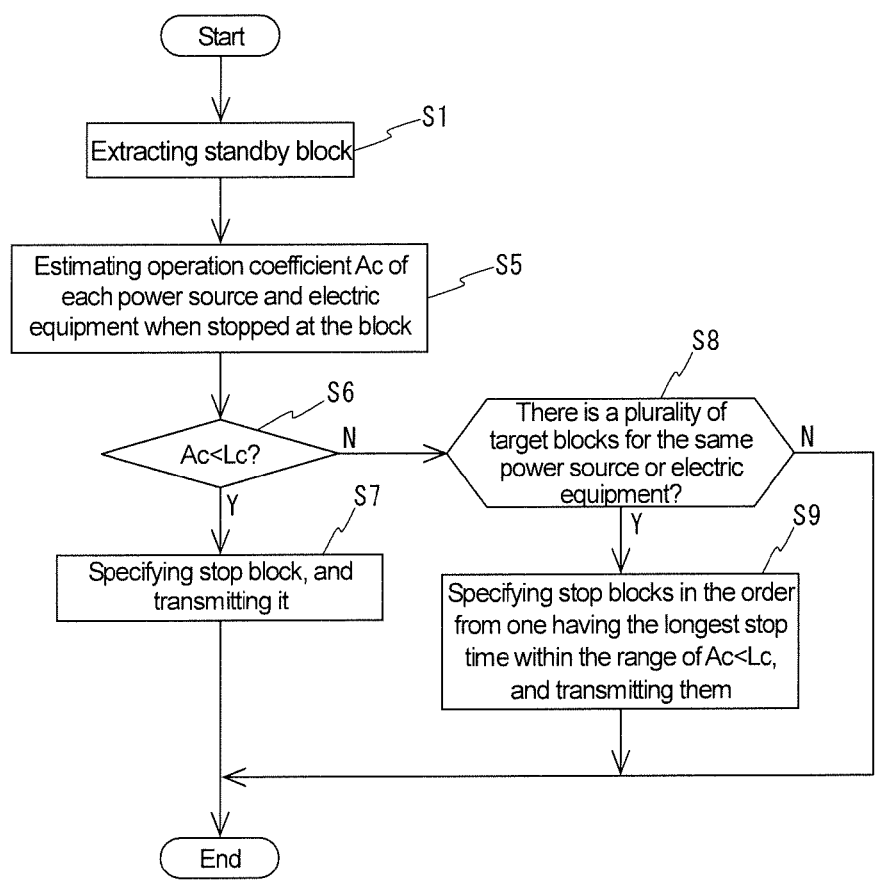
FIG. 9 is a flowchart showing processing in a standby state analyzing unit according to another embodiment of the present disclosure.

Further, in the above embodiment, comparison between the "saved power Pc" and the "power for restart Ps" of the power source and the equipment and comparison between the "operation coefficient Ac" and the "life coefficient Lc" of the power source and the electric equipment are performed to determine whether the power source can be stopped or not; however, the present disclosure is not limited thereto, and, as shown in FIG. 8, only comparison between the "saved power Pc" and the "power for restart Ps" of the power source and the equipment may be performed to determine whether the power source can be stopped or not; alternatively, as shown in FIG. 9, only comparison between the "operation coefficient Ac" and the "life coefficient Lc" of the power source and the electric equipment may be performed to determine whether the power source can be stopped or not. It is noted that the processing steps shown in FIGS. 8 and 9 are similar to the processing steps shown in FIG. 5; therefore, the same processing steps are denoted by the same reference symbols.

Further, in the case where comparison between the "operation coefficient Ac" and the "life coefficient Lc" is performed to determine whether the power source can be stopped or not, this determination may be performed only with respect to the power source. As described above, the electric equipment is relatively inexpensive as compared with the power source. Therefore, when importance is placed on avoiding the complexity of processing, there is a possible case where the electric equipment is not necessarily managed strictly.

Figure 10:
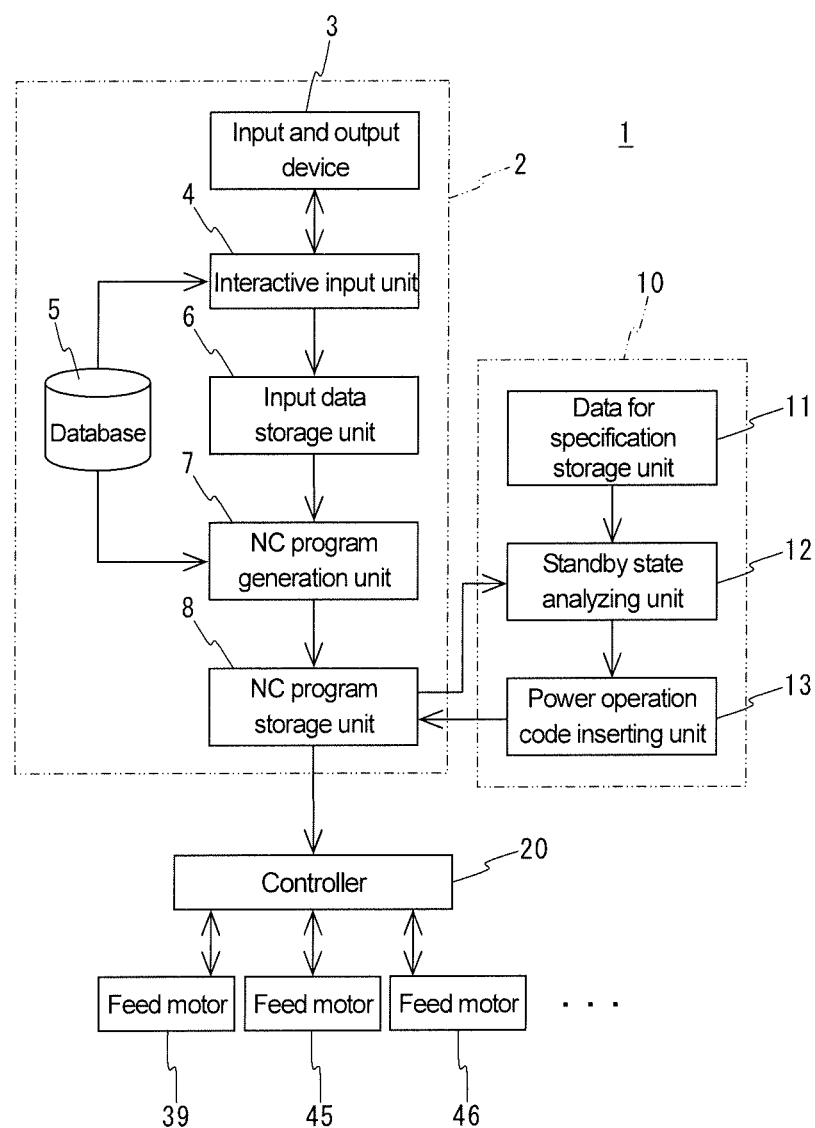
FIG. 10 is a block diagram showing an NC program generating apparatus according to another embodiment of the present disclosure.
Figure 11:
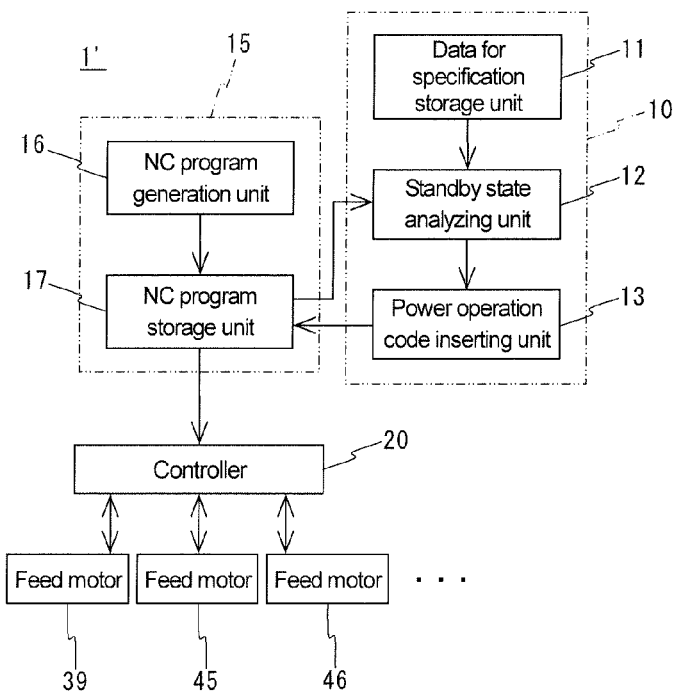
FIG. 11 is a block diagram showing an NC program generating apparatus according to another embodiment of the present disclosure.
Figure 12:
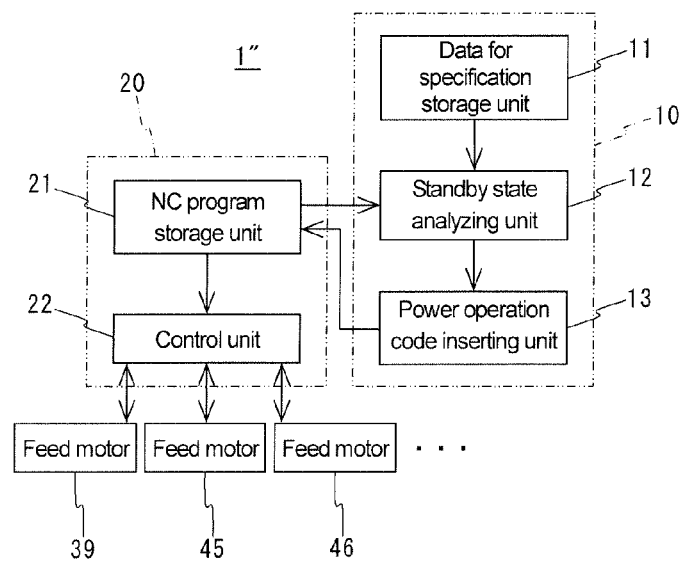
FIG. 12 is a block diagram showing an NC program generating apparatus according to another embodiment of the present disclosure.

Further, in the above embodiment, the second generation unit 10 is configured to perform the processing with respect to the NC program generated by the NC program generation unit 7 of the first generation unit 2; however, the present disclosure is not limited thereto and the second generation unit 10 may be configured to perform the processing with respect to an NC program stored in the NC program storage unit 8 of the first generation unit 2, as shown in FIG. 10. Alternatively, as shown in FIG. 11, the second generation unit 10 may be configured to perform the processing with respect to an NC program generated by an NC program generation unit 16 of another NC program generating apparatus 15, which is not an interactive type apparatus, and then stored in an NC program storage unit 17 of the NC program generating apparatus 15. Alternatively, as shown in FIG. 12, the second generation unit 10 may be configured to perform the processing with respect to an NC program stored in an NC program storage unit 21 of the controller 20. It is noted that the reference numeral 12 in FIG. 12 denotes a control unit.

What is claimed is:

1. An NC program generating apparatus considering power saving which generates, for an NC machine tool including a plurality of operation units each having a power source, an NC program for performing machining by controlling the operation units, the NC program containing at least an NC code for a tool path, comprising:

a standby state analyzing unit which is connected to another NC program generating apparatus or connected to an NC program storage unit storing therein an already generated NC program and which, in a state where the NC machine tool is not operated, directly analyzes NC codes contained in an NC program generated by the another program generating apparatus or NC codes contained in the NC program stored in the NC program storage unit to determine whether, among a plurality of blocks forming the NC program, a block in which at least one of the operation units is brought into a standby state is present or not, and when a block in which at least one of the operation units is brought into a standby state is present, determines whether or not a power source corresponding to the operation unit can be stopped by interrupting or restricting power supplied to the power source at a time of execution of the block, thereby specifying a block at which the power source can be stopped; and a power operation code inserting unit which, when a block at which the power source can be stopped is specified by the standby state analyzing unit, inserts an operation code for stopping the power source at a time of execution of the block into the NC program and inserts an operation code for restarting the power source after the execution of the block into the NC program.

2. The NC program generating apparatus of claim 1, wherein the standby state analyzing unit is configured to estimate power saved when the power source corresponding to the operation unit to be brought into a standby state is stopped, compare the estimated saved power with power estimated to be required for restart of the power source, and, when the estimated saved power is larger than the estimated power for restart, determine that the power source can be stopped.

3. The NC program generating apparatus of claim 1, wherein the standby state analyzing unit is configured to estimate, with respect to the power source corresponding to the operation unit to be brought into a standby state, an operation coefficient Ac that is a ratio of a number of times of operation Aa during machining using the NC program when the power source is stopped and restarted during the standby state to a machining time At taken when using the NC program and compare the estimated operation coefficient Ac with a life coefficient Lc that is a ratio of a limit number of times of operation La to a lifetime Lt set for the power source, thereby determining whether or not the corresponding power source can be stopped.

4. The NC program generating apparatus of claim 1, wherein the standby state analyzing unit is configured to: estimate power saved when the power source corresponding to the operation unit to be brought into a standby state is stopped and compare the estimated saved power with power estimated to be required for restart of the power source; estimate, with respect to the power source, an operation coefficient Ac that is a ratio of a number of times of operation Aa during machining using the NC program when the power source is stopped and restarted during the standby state to a machining time At taken when using the NC program and compare the estimated operation coefficient Ac with a life coefficient Lc that is a ratio of a limit number of times of operation La to a lifetime Lt set for the power source; and when the estimated saved power is larger than the estimated power for restart and it is determined, based on the comparison of the operation coefficient Ac with the life coefficient Lc, that the power source can be stopped, determine that the power source can be stopped.

5. The NC program generating apparatus of claim 3, wherein the standby state analyzing unit is configured to, when there is electric equipment for starting and stopping the power source, further estimate the operation coefficient Ac with respect to the electric equipment and determine whether the corresponding power source can be stopped or not, taking into consideration comparison of the estimated operation coefficient Ac with a life coefficient Lc set for the electric equipment.

6. The NC program generating apparatus of claim 4, wherein the standby state analyzing unit is configured to, when there is electric equipment for starting and stopping the power source, further estimate the operation coefficient Ac with respect to the electric equipment and determine whether the corresponding power source can be stopped or not, taking into consideration comparison of the estimated operation coefficient Ac with a life coefficient Lc set for the electric equipment.

* * * * *